Feb. 13, 1968 D. B. FOSTER 3,369,228
ENVIRONMENT IDENTIFICATION SYSTEM
Filed Aug. 26, 1964 5 Sheets-Sheet 1

Inventor
D.B. Foster
By
Attorneys

Feb. 13, 1968    D. B. FOSTER    3,369,228
ENVIRONMENT IDENTIFICATION SYSTEM
Filed Aug. 26, 1964    5 Sheets-Sheet 4

Inventor
D. B. Foster

Feb. 13, 1968    D. B. FOSTER    3,369,228
ENVIRONMENT IDENTIFICATION SYSTEM
Filed Aug. 26, 1964    5 Sheets-Sheet 5

INVENTOR.
DAVID B. FOSTER
BY
Holcombe, Wetherill & Brisebois
ATTORNEYS

3,369,228
ENVIRONMENT IDENTIFICATION SYSTEM
David Blythe Foster, Windlesham, England, assignor to National Research Development Corporation, London, England, a corporation of Great Britain
Filed Aug. 26, 1964, Ser. No. 392,243
Claims priority, application Great Britain, Aug. 29, 1963, 34,207/63; Apr. 14, 1964, 15,486/64; June 25, 1964, 26,411/64
12 Claims. (Cl. 340—228)

The present invention relates to a system for use by the blind for environment identification by detecting form, colour and distance, although not necessarily simultaneously, of the kind which operates by the conversion of visual characteristics to sound characteristics reproduced or generated by a device or devices carried by the user.

The invention has for an object a system of this kind wherein light-receiving means transfer light to a photo-electric device, the output from which is combined in an expansively non-linear modulation system with frequencies produced by a tone generator, the resultant signal being fed to a sound-reproducing device.

Preferably and in practice the light-receiving means is constituted by a lens which may be simple or compound.

It is a further object of the invention that the expansively non-linear modulation system shall include a circuit arranged substantially to suppress all photo-electric signals below a desired level, the transmitted signal above said level alone being passed to modulate the loudness of an acoustic tone from the tone generator. This circuit preferably includes an adjustably biased transistor to select the level of suppression, the circuit constants preferably being adjustable so that the level of the output above said suppression level is expansively non-linear.

By "expansively non-linear" is meant that the relative slop of the output circuit is greater than the relative slope of its input.

Conveniently, the physical form of the system is a device constructed in the manner of a pair of spectacles so that it may be referred to as "aural-visual spectacles." With these spectacles, the visual aspects of a scene may be converted into a sound equivalent whose constitutive analysis has some correspondence with the visual scene. Alternatively, the system may be arranged to be carried in the hand in the manner of an electric torch or flash-lamp.

In one such embodiment, the device is based on a mechanical skeleton which is in the form of a pair of spectacles somewhat similar to those worn as an "invisible" hearing aid and having a small loudspeaker or bone conduction unit associated with one or both of the earpieces of the spectacles.

In another embodiment, the electric conversion means are contained in the body of a device held in the hand after the fashion of a hand-torch or flash-lamp, and having a lens which picks up light reflected from an object or target upon which the device is trained, an earpiece for conveying the sound resulting from the sound characteristics produced by the device being connected to the casing so that it may be placed adjacent to the user's ear. In another form the device is built into a casing like a miner's safety lamp. If desired, however, the optical and electric components may be dissociated, the optical part being built into a small pencil-like casing easy to hold in the fingers and manipulate for fine scanning of a small target, the electric components being in a separate casing carried on the person and connected to the sound-reproducing device.

Moreover, in apparatus that is carried in the hand or worn on the clothing, the lens used for picking up light reflected from an object is preferably mounted in a rotatable focusing mount so as to focus a sharp image on a plane where is located a photo-electric device such as a photocell or a photodiode, this cell or photodiode being on the axis of the lens or substantially on said axis.

It will be appreciated that the system operation is highly analogous to the way a blind person can build up a picture and recognise events entirely by listening, but it extends this capacity to silent objects and in addition gives a visual-aural colour interpretation.

Furthermore, the system has the outstanding advantage that its use can be taught to a blind person simply by means of a suitable gramophone record or tape recording on which sample tones and hamonies are recorded followed by a spoken interpretation.

It will be appreciated that the system depends entirely on transferring the analytical capacity of the eye to the analytical capacity of the ear and in turn to the mental visualising capacity of the brain, and building up appropriate reflex recognition couplings. Such a system can be learned with remarkable rapidity by blind piano tuners but the general ability to recognise harmonies is so high that any normal blind person could learn the system quickly.

All the electronic techniques for putting such a system into practice are within the established art and comprise essentially a combination of the techniques of electronic tone generation, level control of such tones from the D.C. output of photocells, for example the established techniques of "automatic volume control," mixing transformers or networks and electronic amplification.

If desired, a separate photocell without colour filter may be used for "strength of light" information interpreted either as a separate tone or as a volume control modulation of the colour tones. The system can use an infra-red cell for cold and heat detection interpreted as a tone which will give some personal protection and also has direct recognition of the properties of objects related to their infra-red characteristics of radiation or reflection.

The system is not dependent upon the use of harmonic tones but such are preferred since an harmonic chord is capable of unique recognition after a small amount of training.

In the system described it may be desirable to make step changes in the level values of the constituent tones of the harmonies especially for clarification of interpretation by blind persons having poor musical recognition capacity and this can be effected by the established art of using electronic multi-step level switches, for example of the resistor-diode type.

In one variety of the system using two ranges of angle of vision, either can be switched off e.g. by an eyelid movement of the blind person where the device is in the form of spectacles, to enable him to switch over from the coarse to fine focus for exploration of detail. For example, when approaching the foot of stairs a vertical head scan would result in sound ripple from colour-intensity changes and the lowest movement of the head at the ripple end gives the lowest stair position. Such scanning technique is exactly equivalent to line scanning used on a television picture. It could be intensified in recognition potential probably using a single cell with a definition of say 2″ at 10 feet, and using a differentiating circuit to detect only a change in light intensity. By this technique such details as the keys on a typewriter, the bars of a radiator, the structure panels of a door can be identified. The form of sound interpretation required may simply be a series of clicks giving a "markspace" ratio corresponding to the main defining lines of the object.

Such a system which establishes a new information channel as between a blind person and the outside world can be extended in usefulness by establishing in the outside world special information providing objects and marks which are appropriate to this new form of sensing device. In particular it will be clear that a system of guide lines preferably in a distinguishing colour could be established so that the blind person can find his way along these lines by "locking on" to them and such marks could be established along roads and streets. Furthermore, such a marking system could be developed with additional associated marks in either a mark space or colour guide to give information to the blind person about street intersections, bus stops, and even street names. In general, all the established techniques at present used in automatic photoelectric decoding devices as used with punched cards and tapes can be brought to bear with the blind person providing the sequence functions by his own forward or head motion when using aural-visual spectacles, or by guiding his hand or body when the system is embodied in apparatus carried in the hand or on the clothing. In particular, a pattern of colour marks in sequence could establish the "bits" of the binary system to give a full alpha-numeric language. Alternatively, black and white marks could be employed and this could lead to a simplified system for route finding only in which a sequence of alternative black and white marks establishes route clicks and a different pattern gives position information. Alternatively, a black and white system could be used with harmonic chord interpretation. Such a system might use phosphorescent or fluorescent marking for night route finding. As a supplementary technique for aural-visual conversion, frequency shift can be used so that, for example, a brighter impression raises the frequency of the heard zone. Thus, harmonic sounds and changes, frequency shifts, amplitude changes, or digital conversion may be used in establishing a system, and such interpretive data may be used separately or in any combination.

In order that the invention may be more clearly understood, reference will now be made to the accompanying drawings which illustrate some embodiments thereof by way of example and in which.

Figure 1:
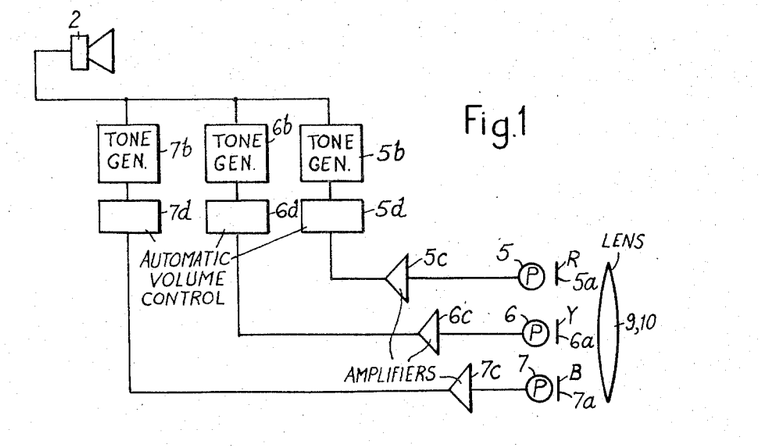
FIGURE 1 shows a block schematic circuit diagram of a first system embodying means for the detection of colour.
Figure 2:
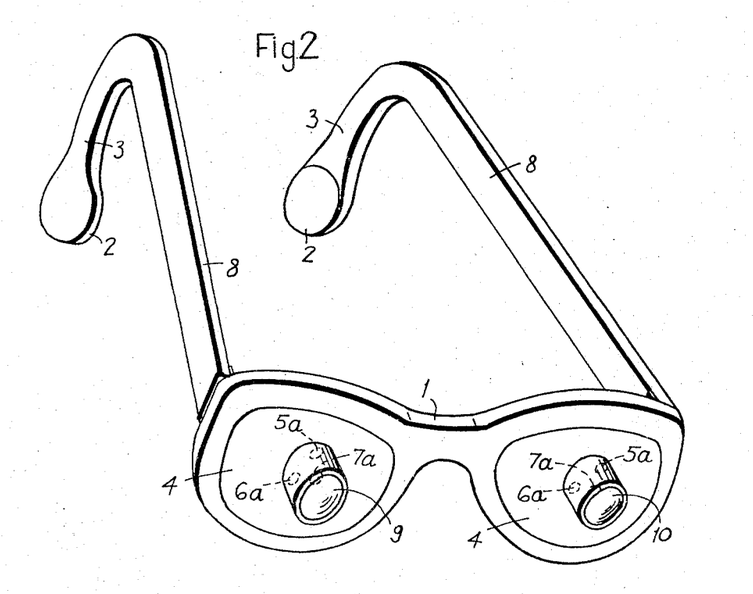
FIGURE 2 is a somewhat diagrammatic form of "visual-aural" spectacles into which a system according to the invention, particularly a system as illustrated in FIGURE 1, can be built.

Referring now to the drawings, FIGURES 1 and 2 show a first system for practising the invention. The device of this system comprises a skeleton 1 in the form of a pair of spectacles, similar to those worn as an "invisible" hearing aid and having a small loudspeaker 2 associated with one or both earpieces 3 of the spectacles. Instead of a loudspeaker, the transducer 2 may be a bone-conduction unit of any known kind.

Located in the position of one or both of the normal lenses e.g. in a disc 4, are three miniature photocells or photodiodes 5, 6, 7 each covered by a different colour filter 5a, 6a and 7a such as red, yellow and blue. The sides 8 of the spectacles are used to house an electronic system similar to that used in spectacle hearing aids but having the following functional properties. The electronic system illustrated has three tone generators 5b, 6b, 7b which may correspond respectively to the musical frequencies of middle C (256 vibrations per second), the note E above, and the note G above the latter, thus the three corresponding to the musical chord CEG, i.e. the major fifth chord.

The outputs from the three photocells or photodiodes 5, 6, 7, responsive to the three primary colours chosen are suitably amplified in expansively non-linear amplifiers 5c, 6c and 7c fitted with automatic volume control circuits at 5d, 6d and 7d, and the signal strength from each is caused to control the level of amplitude of the three sound tones CEG. In this way a spectrum of light falling on the three photocells or photodiodes 5, 6, 7 will produce a chord quality as in the following table:

Red _________________ C ("Dominant").
Yellow _______________ E ("Third").
Blue _________________ G ("Fifth").
Red and Yellow _______ CE ("Major Third")=Orange.
Red and Blue _________ CG ("Dominant and Fifth")=Purple.
Yellow and Blue _______ (A "Minor Third" Chord starting on E)=Green.

Thus by taking the resultant output to the sound-reproducing device in the earpiece 2, a blind person will hear musical notes and harmonies corresponding to the main light colours Red, Orange, Yellow, Green, Blue, Purple, and when all notes are present at the same strength this will correspond to White.

Thus by such a system a blind person can acquire a degree of aural-visual colour sensitivity.

A lens is placed in front of the or each set of photocells 5, 6, 7 and filters 5a, 6a, 7a, the lens having a particular field of view and thus the blind wearer by moving his head will hear colour-harmony changes which will enable him to distinguish the colours of the objects towards which he is facing and according to the angle of vision of the lens.

The angle of vision of the lens may be made wide or narrow, for example in the latter case corresponding to a circle of six inches diameter at ten feet and thus as by head movement as he scans objects he will hear a sharp change in harmony corresponding to a colour change and in this way he is in a position to recognise the form of objects having a marked colour change from the adjacent background. By a development of skill in controlling the motion of the head and thus the spectacles he is able to scan the periphery of objects and to build up a mental picture of form. By a simple change in focal length of the lens the discriminating power may be altered to be suitable to the closeness or farness of the general environment. Alternatively, it might well be suitable to have one system of wide angle associated with one eyepiece at lens 9 and one ear, and a second system associated with the second eyepiece at lens 10 and the second ear, such an arrangement having some correspondence with the general acuity of the eye and the more pronounced acuity of the narrow central angle of the eye. FIGURE 1 shows one only of the two generator/amplifier systems that would be used in such an arrangement.

Furthermore by this double focusing system a degree of distance and perspective capacity can be developed. The amplifiers, tone generator and automatic volume control circuits may be in accordance with known practice in the art and since they are well known, there is no need to elaborate them here.

Figure 3:
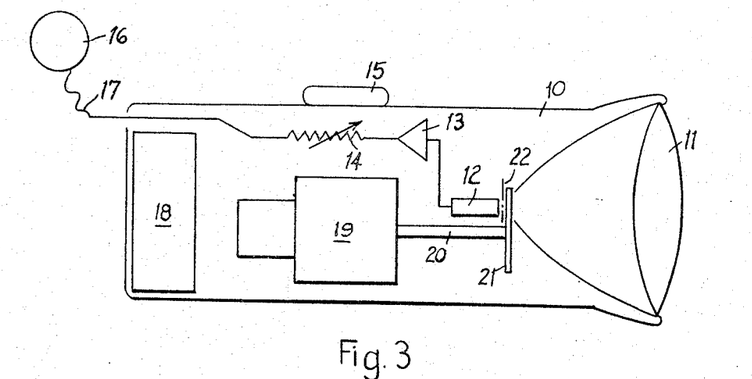
FIGURE 3 shows a diagrammatic representation of a suitable hand-held casing for supporting the components.

Referring now to FIGURE 3 there is shown a device comprising a casing 10 to one end of which is fitted a lens 11 somewhat similar to a hand-torch or flash-lamp. The device is trained onto an object or a field of vision which the lens 11 focuses onto a photocell 12, the output of which is amplified by an amplifier 13 whose output level is controlled by a variable resistor 14 under the control of a thumb slider 15. The controlled output is taken to an earpiece 16 worn by the user, the inter-connecting lead being shown at 17.

In order to produce the necessary tone, a battery 18 is arranged to energize a motor 19 connected by a shaft 20 to a tone generating disc 21. A surface having a radial slit 22 is located between the disc 21 and the photocell 12.

Figure 4:
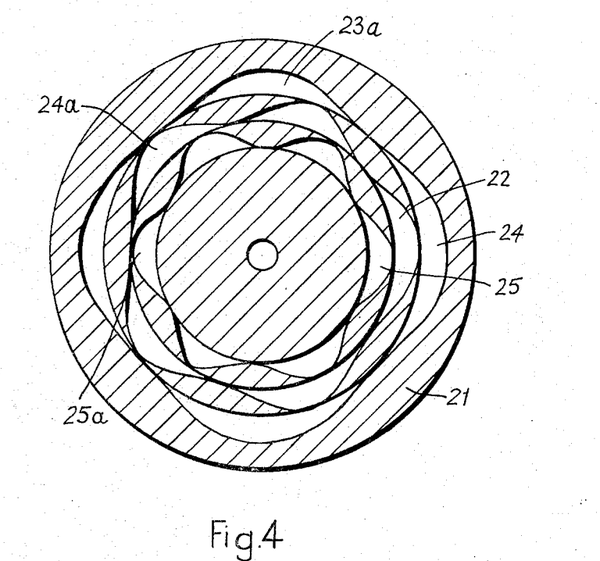
FIGURE 4 shows a tone generating disc for use with the device of FIGURE 3.

The discs 21 is shown in plan view in FIGURE 4 from which it can be seen that the disc consists of three concentric bands 23, 24 and 25, each band containing coloured transparent lobes 23a, 24a and 25a arranged in series around the band, the remainder of each band being opaque. The form of each of the lobes 23a, 24a or 25a is such that as the disc is rotated in front of the radial slit 22 the light intensity permitted to pass through the coloured transparent portions is sinusoidally modulated with respect to angular displacement and thus they will cause a pure tone to be generated by the photoelectric cell and amplifier system. The disc shown in FIGURE 4 has four transparent lobes 23a in the outer band, the middle band has five lobes 24a and the centre or inner band has six lobes 25a. The disc shown is larger than actual size: the approximate full size would be 20 mm. across.

If this disc is rotated at a speed of, say, 300 r.p.m. the system will generate three musical notes having frequencies of 200, 250 and 300 cycles per second which corresponds to a musical scale harmonic relationship equivalent to doh, mi and sol or respectively the notes C, E and G.

By the laws of Fourrier analysis, these three separate tones will be heard even though the receiving system has only one receiving photocell 12.

The three separate tone-generating transparent lobe sequences are coloured in three primary colours so that the balanced tones heard by the user are amplitude-modified according to the colour constitution of the incident light.

The device is used in a manner similar to that described in the arrangement of FIGURES 1 and 2 except that the user guides it by hand and not by his head.

In order to manufacture the tone-generating disc 21, an enlarged diagram may be made (as shown in the drawing), the transparent lobes being appropriately coloured, and then a reduced copy is made to result in a coloured transparency. The actual colours and density to be used are such as best to represent primary colour conversion when considered in relation to the colour characteristics of the photocell being used.

The system described above may be modified in many ways. A band pass filter of known kind may be associated with the amplifier 13 in order that high amplifications can be obtained with minimum noise levels. Although the motor 19 has been referred to as an electric motor energised by the battery 18, it will be appreciated that a clock-work motor may be used in its place. Again, an optical system using a reflector may be used instead of or in conjunction with the lens 11.

If desired, a certain degree of automatic volume control based on the level of the ambient light may be used and incorporating a separate photocell to receive such light and utilizing conventional A.V.C. techniques. If desired, an optical system of variable focus may be used to change the effective diameter of the field of vision at a given distance.

The thumb control 15 for the variable resistor 14 may be notched to give a code for indicating the light intensity for a given sound level.

Instead of using a coloured tone-generating disc 21 the transparent lobes 23a, 24a and 25a may be colourless and three colour filters may be used at the position of the radial slit 22 to intercept in colour the light from the respective three tone bands. In another modification three separate photocells may be used with such an arrangement in conjunction with electric signal mixing.

Whilst this method of forming the tone-generating disc has been described above, it will be appreciated that it could also be manufactured by optical digitiser techniques.

The lens 11 may, in a modification, have associated with it an iris diaphragm so that the lens may be operated at variable aperture which is controlled by hand adjustment by the blind person since it has been found in practice that it is highly desirable for the average density of the light falling on the photocell or the photodiode to be comparable when in bright light or dull light, since the useful information to be extracted primarily depends upon relative contrast of light falling on light and dark objects.

The value of this iris diaphragm will also be understood related to the following point. Due to the poor sensitivity of the ear to loudness changes, it is desirable to magnify these by the use of an expansively non-linear electrical amplifier which may be the amplifier 13 of FIGURE 3 or a subsequent or following stage, the construction of expansively non-linear amplifiers either by positive feed back or by diode networks or other means being well established in the electronic art. However, it is not normally possible to devise such amplifiers to be effective over the whole range of light amplitudes encountered in normal life, but by associating the iris diaphragm with the optical part of the system and closing the iris in bright light it is easily possible to retain the magnifying effect of loudness in the heard tone under all ambient light conditions. Furthermore, it will be apparent that the adjustment of the aperture may be effected by automatic means related to the strength of the ambient light: such means are already generally available in automatic cameras having an automatic aperture adjustment by photoelectric detection of the ambient light.

A device constructed according to these principles produces a clear loudness distinction in the ear of a blind person corresponding to dark and light distinctions at the center of the field of vision of the lens. Thus by moving the device in a scanning motion the blind person can deduce much information concerning his environment, for example, as to the position of windows in a room, and the identity of objects characterized by light and dark changes corresponding to peripheral definitions of form and detail. By such means it is also possible to identify written characters and code marks since the scanning action is converted to loudness changes.

In a further development of this device a second disc which is rotatable by hand about its axis, contains windows which can be brought in front of the light beam focusing on the photocell or photodiode and such windows may comprise colour filters of different characteristics so that by bringing different windows to bear on an object in the field of vision some differentiation as to colour can be detected. Such windows may also be corrected by neutral filters of varying density to compensate for the non-linear characteristics of the photocell or photodiode used and a neutral filter can also be used in one position not having a colour filter so that the black and white loudness can be made comparable to the sum of the loudness using the colour filters, and thus establish a useful comparative reference for colour identification. In one version of technique, the tone-generating lines, the colour filters and the neutral density correction filters can all be manufactured by the known techniques of colour photography.

This colour detection effect can also be alternatively detected by means of an optical prism located in a plane behind the second disc and in front of the photocell or diode, with means for moving the latter so that it manually scans the colour spectrum and such motion could, if required, be interlocked with a speed control on the motor so that colour changes are represented by audible changes in pitch.

It will be apparent that the rotating disc for direct modulation of incident light into A.C. frequency signals can be achieved by other means such as oscillator-driven "light valves" of the variation density type developed by Western Electric Co. or the variable area type developed by the Radio Corporation of America or by galvanometers or vibrating reeds, as will be well understood by those skilled in this art.

Figure 5:
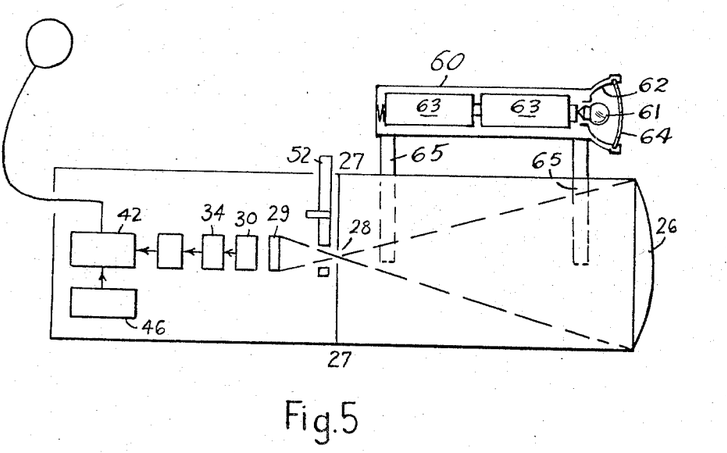
FIGURE 5 shows a schematic view of another and presently preferred device adapted to be carried in the hand or on the clothing.
Figure 6:
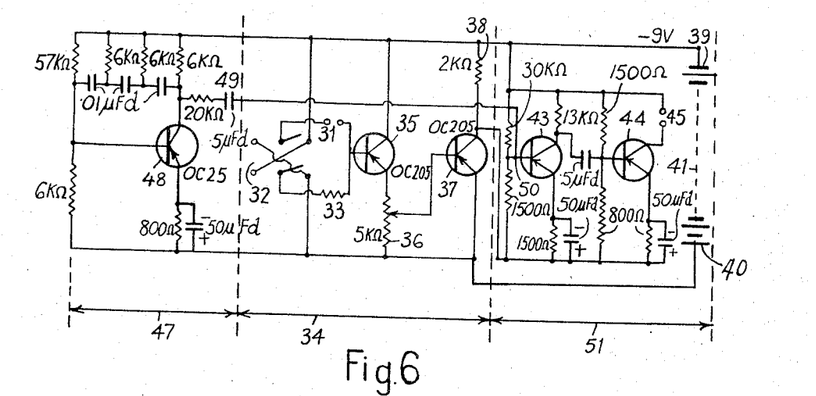
FIGURE 6 shows a circuit diagram of an electronic system for use with the device of FIGURE 5, FIGURES 7(a), (b), (c) and (d) show a family of pulse-shaping graphs.
Figure 7A:
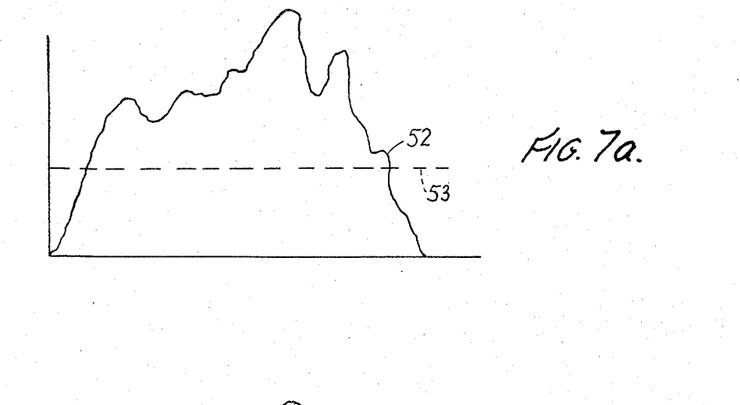
Figure 7B:
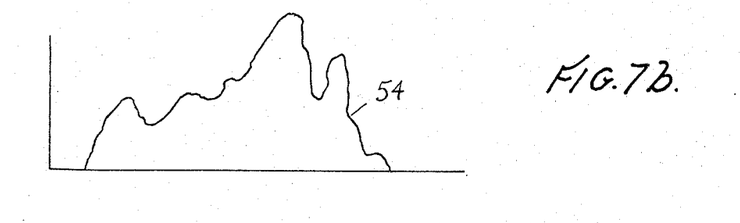
Figure 7C:
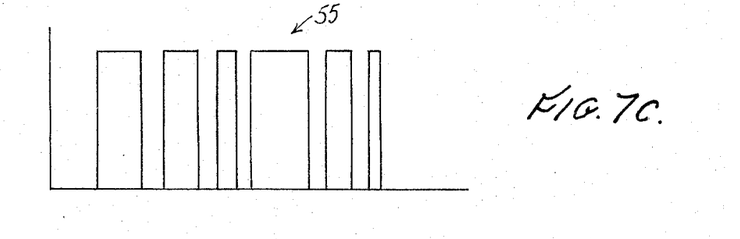
Figure 7D:
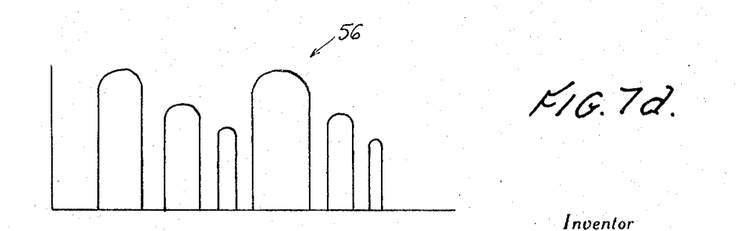

Referring now to FIGURES 5 and 6, FIGURE 5 shows a device which is generally in the form of a hand-torch or flash-lamp having a lens 26 which can focus a sharp image on to a focal plane 27—27. At the focal plane is an opaque diaphragm which at its centre has a pinhole 28 of, say, 1 mm. diameter, and the emergent light falls onto a photocell 29. Thus by hand scanning of the device the light and shade of any image at the centre of the focal plane causes corresponding electrical changes in the photocell output.

It will be observed that the location of the photocell 29 is such as to entrap a cone of light of an angle equal to the angle subtended by the lens 26 at the focal plane 27—27 and in this way quite large photocells can be used whilst preserving an accuracy of light signal definition set by the size of the pinhole 28, and yet collecting most of this light cone. For example, with a pinhole of 1 mm. diameter, the photocell diameter may be 1 cm.

The signal from the photocell may optionally be first taken to an inverting switch 30 and reference to FIGURE 6 will indicate the action as follows. It has been found in practice that with such photoelectric devices there can be great advantage in sometimes making the loudness of a tone correspond to intensity of illumination whereas sometimes it is desired or advantageous to make the loudness increase with darkness of the particular part of the field of vision. Thus, for example, if a blind person uses the device to follow a white line then it is better for loudness to increase with brightness whereas if he is looking for a rising step it is better to look for the shadow under the step and therefore to arrange that loudness shall increase with darkness. In order to give the user an appropriate choice, the function 30 of FIGURE 5 can be created by the electrical circuit of FIGURE 6 in which the output from the photocell on contacts 31 is taken to a double-pole changeover switch 32 which in combination with a resistor 33 can place the cell 29 and resistor in optional arrangement in a potentiometer circuit.

With the contacts 31 in the position shown in FIGURE 6, the device will give increased loudness for increased light intensity whereas with the switch thrown in the opposite direction, the opposite coupling of loudness with dark results.

Referring back to FIGURE 5 the output from the cell-resistor potentiometer is next taken to an amplifier 34 consisting of a transistor (FIGURE 6 at 35) in the emitter circuit of which is a manually controlled potentiometer 36 and which influences the following transistor (FIGURE 6 at 37) to trigger according to the potentiometer setting. The collector of transistor 37 has a fixed resistor 38 so that when the transistor 37 is highly conducting, substantially the whole of the battery volts supplied from the negative terminal 39 and the positive terminal 40 of a battery 41 will appear across the resistor 38. In turn there follows a conventional transistor amplifier, 42 in FIGURE 5, made up of transistors shown at 43 and 44 in FIGURE 6, feeding a headphone earpiece or loudspeaker connected at 45. However, it is arranged that the battery supply for this amplifier 43–44 is derived from the voltage across the resistor 38 in the collector of the transistor 37 and it will thus be clear that any input to the amplifier will be proportionally modulated as to amplitude by the state of the transistor 37.

Separately there is provided a tone-generating oscillator (FIGURE 5 at 46, FIGURE 6 at 47) which may conveniently be of the phase shift type using one transistor at 48 (FIGURE 6) the output of which appears at 49 and is taken to the final amplifier input at 50.

Thus the overall co-operation of the components is to set up a system in which an oscillating tone is amplified by the amplifier (51 of FIGURE 6) to a degree to which the state of the transistor 37 permits a voltage to be generated for the collector circuits of 51.

According to the setting of the switch (32 of FIGURE 6) and the potentiometer 36 there is established a very sensitive audio tone signal whose loudness is critical with a small change of light or dark and the general effect is that the system has an expansively nonlinear amplification characteristic with regard to small changes in light increase or dark increase.

By this means it has been found possible to detect the presence of a 1" wide white tape against a darker background at a distance of ten yards particularly when the switch 32 is in the "more brightness more loudness" position whereas it has also been possible to detect a narrow door painted with an edging of some 3" wide against a lighter background from a distance of twenty yards when the device was in the "more darkness more loudness" state. Furthermore, particularly in the latter state it has been found possible to read characters such as letters, numbers and symbols including both code-marks and familiar objects by scanning with the system, a typical example being the scanning reading of six inch letters of the alphabet each made up of ½" wide black strokes, from a distance of six feet.

These experiments have proved the high desirability of expansive nonlinear amplification to an extreme degree, barely short of "switching," in order to make signals stand out to the degree required for recognition by a blind person but if this is done then a great deal of useful information can be obtained by a blind person as regards the environment. The system as described is particularly useful for following lines such as a one inch white line in a factory or in public streets and it is possible to follow such lines with no difficulty and at normal walking speed. This is achieved by continuous scanning by hand movement preferably in the horizontal plane. Furthermore such arrangements of placed marks can be supplemented by other symbols, for example, further parallel lines which can be used to indicate places and changes and positions of danger.

It will also be apparent that a rotatable colour disc wheel referred to hereinabove and now shown at 52 in FIGURE 5 may be used, in which different colour filters are brought into play by manual means in order to indicate colour by change in loudness.

When extra sensitivity is required, for example, when the device is used under conditions of artificial light, it has been found advantageous to amplify the signal from the photocell 29 by means of an A.C. amplifier having an extended frequency range at the lower end, for example, having a lower frequency cut off at, say, one cycle in ten seconds. By this means complications involved in the use of scanning discs and light valves may be avoided for those applications where some physical scanning motion is involved, since such a system virtually gives the benefits of a high degree of D.C. amplification but does not transmit actual D.C. current values either due to a "dark current" or to those D.C. currents which may be involved in the associated transistor circuits. Such a system can only be effective when the scanning rate is faster than the lower frequency of cut-off of such an amplifier but since such practical applications are in the majority, the system described is simple, effective and economic.

Figure 8:
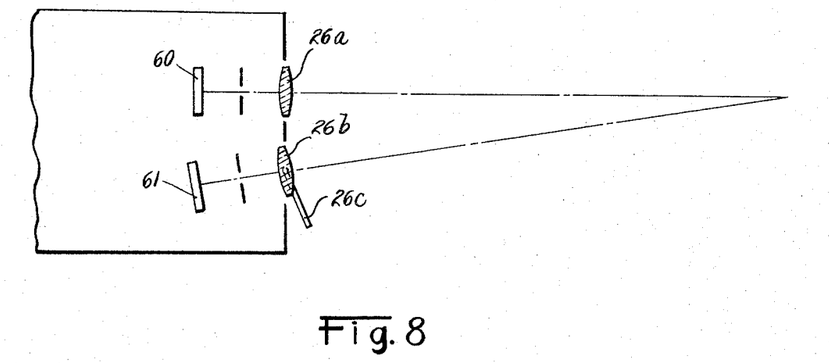
FIGURE 8 shows a diagrammatic representation of an arrangement in which the optical system comprising the light-receiving means is duplicated so that the degree of adjustment of the system may be used for rangefinding purposes.
Figure 9:
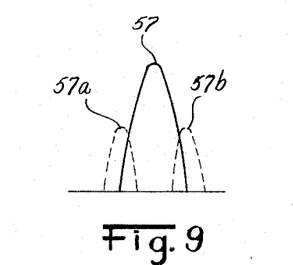
FIGURE 9 illustrates the acoustic peaks produced by the arrangement of FIGURE 8.

It will also be apparent that by the use of two lenses 26a, 26b, either giving a field of vision to two separate photocells 60, 61, as shown in FIGURE 8 or giving a second image to the same cell through "split field" technique and with means 26c for causing angular rotation of one of the lenses, then a degree of rangefinding can be incorporated, because with the lenses in the same plane a double field of vision will be created so that the aural result is two sounds on scanning as shown at 57a and 57b in FIGURE 9, whereas if one of the lenses is angled relatively to the first lens so that only one coincident field of vision is created and resulting in only one aural sound 57 from a given object, then the degree of angularity required to cause this coincidence is a measure of the distance from the object. It will also be appreciated that the technique used on camera rangefinders to cause coincidence of an image can equally well be employed.

If desired, and particularly for use in close-up work the device may conveniently be incorporated in the form of a "miner's lamp" and worn from a band round the forehead and thus releasing both hands for other activities.

The "rangefinding" technique described above can be embodied in a device in the form of spectacles as referred to in FIGURES 1 and 2 and in which the normal lens separation required for a base for rangefinding corresponds to the distance between the centres of spectacle lenses 9 and 10.

Reference has been made herein to expansively nonlinear amplifiers and circuits in pulse-shaping state or near thereto; one of the advantages is that these have the practical effect of "sharpening up" the aural sound from the edge of an image even though this image is out of focus and as a result it is possible apparently to receive sharp images as to aural interpretation even when those images are optically blurred. This can dispense with the need for any or partial optical focusing arrangements.

FIGURE 7 shows the application of pulse-shaping in the present invention. Suppose the output from the device (FIGURE 7a) initially is at 52, if the bias is set at 53, the resultant waveform is as shown at FIGURE 7b at 54. FIGURE 7c shows the result of conventional pulse-shaping of waveform 54 at 55 and FIGURE 7d shows the result of only partial pulse-shaping at 56, the amplitudes of the discrete steps being dissimilar. The latter operation is preferred.

If desired, the optical arrangements may be contained in a very small pencil-like container for use in close-up or small-scale work such as photo-electric reading, reading the time off a watch, or for technical purposes. The electronic apparatus may be miniaturised and contained in the same casing, or be built into a separate pack.

It will be appreciated from the above that a device according to the invention responds to light reflected from an object or scene. If it is desired to use the device under low-level illumination, or in the dark, then a light source such as a hand-torch may be added thereto e.g. as shown in FIGURE 5, where a hand-torch comprising a casing 60 having a light bulb 61 in a reflector 62 and fed by batteries 63 to cause light to shine through a lens 64 onto the object under the control of a switch (not shown), is clipped to the device by clips 65. The illuminating hand-torch is conventional and on operation throws a beam of light at the object which is then "seen" by the device to produce the audio signals as referred to above.

I claim:

1. A system for use by blind persons for environment identification in which the visual characteristics of a field of view are converted to sound characteristics reproduced or generated by a device or devices carried by the user, said system comprising light-receiving means, an expansive nonlinear modulation system having first and second inputs and one output, a photo-electric device conected to receive light from said light-receiving means and deliver to said first input a current having a parameter proportional to the intensity of light received from said light-receiving means, a tone generator connected to feed frequencies to said second input, and a sound reproducing device connected to said output, said nonlinear modulation system comprising means to combine the frequencies from said tone generator with the output from said photo-electric device to form an audio output signal for feeding to said sound-reproducing device, said combining means comprising means to continuously regulate the amplitude of said frequencies, whenever said intensity passes a threshold level, in response to variations in the intensity of the light received by said light-receiving means, in accordance with a predetermined expansive nonlinear amplifying characteristic, and means for preventing the output from said photocell from regulating said signal when said intensity is below said threshold level, said last mentioned means being adjustable to vary the threshold level past which regulation is prevented.

2. A system as claimed in claim 1, wherein said light receiving means is a lens mounted at one end of said device.

3. A system as claimed in claim 1, wherein said regulation preventing means includes an adjustably biased transistor operative to select the level of suppression.

4. A system as claimed in claim 1, comprising selecting means movable to cause either light objects or dark objects to create a louder acoustic tone in said tone generator.

5. A system as claimed in claim 4, wherein said selecting means comprise inverting means electrically to invert the functions of said photo-electric device, and a resistor in a voltage divider circuit.

6. A system as claimed in claim 1, wherein said nonlinear modulation system includes pulse-shaping circuits operative to subject the transmitted anologue signal above the suppression level to pulse-shaping to convert said signal to a series of sharply-defined pulses.

7. A system as claimed in claim 1, including a pre-amplifier connected to said photo-electric device to amplify the signals from said photo-electric device for use in low ambient light conditions, said pre-amplifier consisting of a long time-constant alternating current amplifier whereby effective amplification may be effected of light reflected from stationary objects, said time constant of the pre-amplifier being longer than the scanning time.

8. A system as claimed in claim 7, wherein said pre-amplifier has a time constant which is not less than three seconds.

9. A system as claimed in claim 1, which is built into a hand-torch device.

10. A system as claimed in claim 1, wherein a light beam-projecting means is additionally provided so that the system can be used in ambient darkness, the light beam being directable towards the same target or field of view as the system per se.

11. A system as claimed in claim 1, wherein said light-receiving means is divided into two parts, said two parts being co-ordinatable so that at random settings, an object in the field of view creates two acoustic peaks in the sound-reproducing device when the object is scanned, but when the two parts are co-ordinated for concentration upon a specific distance, only one acoustic peak is created, means being provided to utilise the degree of adjustment to bring this effect about, to constitute a measure of the range of the object in the field of view.

12. A system as claimed in claim 1, wherein the light from the light-receiving device falling on the photo-electric device is regularly chopped by means selected from the group consisting of a transparent rotating and, whereby the signal falling on to the cell is of an alternating nature, thus facilitating alternating current amplification.

References Cited

UNITED STATES PATENTS

| | | | |
|---|---|---|---|
| 1,731,127 | 10/1929 | Diehl | 250—226 |
| 1,798,118 | 3/1931 | Clifton | 340—228 |
| 1,820,357 | 8/1931 | Lindstrom et al. | 340—228 |
| 2,302,554 | 11/1942 | Kingsbury | 250—226 |
| 2,493,543 | 1/1950 | Merchant | 340—228 |
| 2,506,946 | 5/1950 | Walker. | |

JOHN W. CALDWELL, *Primary Examiner.*

MAX L. LEVY, NEIL C. READ, *Examiners.*

D. L. TRAFTON, *Assistant Examiner.*